(12) United States Patent
Kennedy

(10) Patent No.: US 10,870,971 B2
(45) Date of Patent: Dec. 22, 2020

(54) HYDRANT DRAIN

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 35 days.

(21) Appl. No.: 16/386,721

(22) Filed: Apr. 17, 2019

(65) Prior Publication Data

US 2020/0332501 A1    Oct. 22, 2020

(51) Int. Cl.
*E03B 9/14* (2006.01)
*E03B 9/04* (2006.01)
*F16K 27/00* (2006.01)

(52) U.S. Cl.
CPC ............... *E03B 9/14* (2013.01); *E03B 9/04* (2013.01); *F16K 27/006* (2013.01)

(58) Field of Classification Search
CPC . E03B 9/14; E03B 9/04; F16K 27/006; Y10T 137/5327–5538
See application file for complete search history.

(56) References Cited

U.S. PATENT DOCUMENTS

| 10,306 A * | 12/1853 | Cochrane | E03B 9/14 137/281 |
| 14,712 A * | 4/1856 | Culver | E03B 9/14 137/281 |
| 19,513 A * | 3/1858 | Powell | E03B 9/14 137/281 |
| 24,290 A * | 6/1859 | Fay | E03B 9/14 137/281 |
| 107,434 A * | 9/1870 | Bailey | E03B 9/04 137/291 |
| 114,283 A * | 5/1871 | Gallagher | E03B 9/20 137/292 |

(Continued)

FOREIGN PATENT DOCUMENTS

DE            738178 C  *  8/1943  ............... E03B 9/14

OTHER PUBLICATIONS

Machine Translation of DE738178C retrieved from espacenet.com on Jul. 2020. (Year: 2020).*

(Continued)

*Primary Examiner* — Jessica Cahill
(74) *Attorney, Agent, or Firm* — Brown & Michaels, PC

(57) ABSTRACT

A fire hydrant drain includes an elongated, hollow body having a first portion, a second portion, and a third portion. The first portion is configured to protrude a first length radially through an outer wall of a fire hydrant. The second portion is continuous with and between the first portion and the third portion. The second portion includes a first bend having a first curvature degree and a first curvature direction, and a second bend having a second curvature degree and a second curvature direction. The first curvature degree is larger than the second curvature degree, and a direction of the first curvature is opposite a direction of the second curvature. The first bend is between the first portion and the second bend. The third portion extends a second length, and an angle between the first length and the third length is less than 90 degrees.

19 Claims, 3 Drawing Sheets

(56) References Cited

U.S. PATENT DOCUMENTS

| | | | | |
|---|---|---|---|---|
| 114,996 A * | 5/1871 | Walsh | ................ | E03B 9/14 |
| | | | | 137/281 |
| 128,192 A * | 6/1872 | Walsh | ................ | E03B 9/14 |
| | | | | 137/281 |
| 1,349,062 A * | 8/1920 | Goldberg | ............. | E03B 9/04 |
| | | | | 137/283 |
| 2,598,488 A * | 5/1952 | Bart | .................. | E03B 9/14 |
| | | | | 137/282 |
| 3,017,896 A * | 1/1962 | Papacek | ............. | E03B 9/14 |
| | | | | 137/282 |
| 4,854,339 A * | 8/1989 | Hoeptner, III | ......... | E03B 9/04 |
| | | | | 137/282 |
| 2014/0251441 A1 * | 9/2014 | Smith | ................ | E03B 9/14 |
| | | | | 137/1 |

OTHER PUBLICATIONS

EJ Group, Inc. "5BR250 WaterMaster Fire Hydrant"; 2011.
EJ Group, Inc. "5BR250 WaterMaster Fire Hydrant w\CD"; Jul. 2019.

\* cited by examiner

HYDRANT DRAIN

BACKGROUND OF THE INVENTION

Field of the Invention

The invention pertains to the field of fire hydrants. More particularly, the invention pertains to a drain for a fire hydrant.

Description of Related Art

A dry-barrel fire hydrant is particularly well suited to colder climates where low temperatures can freeze water in a hydrant and block the flow of water to the hydrant's outlets. In a dry-barrel fire hydrant, an above-ground portion of the hydrant is separated from a pressurized water source by a main valve in a lower barrel or an elbow of the hydrant below ground. The upper barrel remains dry until the main valve is opened by means of a long stem that extends from the main valve, through the upper barrel, to the top, or bonnet, of the hydrant.

FIG. 1 is a cross-section of a conventional fire hydrant 10. Referring to FIG. 1, an upper barrel 10, generally made of cast iron, is installed above ground level and is provided with outlet ports 12 for attachment of fire hoses. A barrel cap 14 at the top of the upper barrel 10 houses an operating stem nut 16, which can be turned to open or close the flow of water into the hydrant 1.

The upper barrel 10 is connected to one end of a lower barrel 20 via a coupling element 22, generally of a breakaway design such that the upper barrel 10 can separate from the lower barrel 20 cleanly at the coupling element 22, for example, if struck by an automobile. The lower barrel 20 provides a conduit through which water (or another fluid) can flow from a location below the frost line, to the upper barrel 10 where the water is needed for subsequent use in firefighting.

The other end of the lower barrel 20 is similarly connected via a mating flange 24 to a first mating flange 31 of an elbow 30 containing the hydrant's main valve assembly 40. The elbow 30 and the main valve assembly 40 are shown in greater detail in FIG. 2. The elbow 30 can also be connected to a water main via an intervening gate valve (not shown) that can isolate the hydrant 1 from the water main during installation, repair, or replacement of the hydrant 1. In this embodiment, a second flange 32 of the elbow 30 is provided on one end of the elbow 30 for this purpose.

The operating stem nut 16 in the barrel cap 14 is threaded to a first end 51 of an operating stem 50, which includes an upper stem 52, a lower stem 54, and a breaking stem coupling element 56. The operating stem 50 traverses inside the upper barrel 10 and the lower barrel 20, and is connected to the main valve assembly 40 inside the elbow 30 at a second end 57 opposite the first end 51. Turning the operating stem nut 16 raises and lowers the operating stem 50 and thus the main valve assembly 40, including a main valve seal 41, against or away from a main valve seat 42, which is located in the elbow 30 below the first mating flange 31 of the elbow 30. A valve seat insert 43 is inset in, and sealed against, the elbow 30, above the level of the main valve seal 41, and the main valve seat 42 is set and sealed against the valve seat insert 43, such that when the main valve seal 41 closes and seals against the main valve seat 42, water is sealed in the elbow 30 below the main valve seal 41 and the main valve seat 42. Thus, the elbow 30 has a "wet" side, below the main valve seal 41 and the main valve seat 42, and a "dry" side above the main valve seal 41 and the main valve seat 42.

Drain holes 34 located through the elbow 30 and the main valve seat 42, allow the upper barrel 10 and lower barrel 20 to drain water to surrounding gravel beds or concrete basins when the hydrant main valve seal 41 is closed against the main valve seat 33 after use. Hence, the term "dry barrel" hydrant is applied, as no water remains present in the hydrant's upper barrel 10 and lower barrel 20 when the main valve seal 41 in the elbow 32 is closed against the main valve seat 42.

The main valve seal 41 is disposed between a main valve bottom plate 44 below the main valve seal 41, and a drain valve body 45 above the main valve seal 41. The lower stem 54 passes through the drain valve body 45, and the main valve seal 41, and is threaded into the main valve bottom plate 44. Once assembled, a drain valve pin 46 inserted through the drain valve body 45 and the lower stem 54 prevents rotation of the lower stem 54 relative to the main valve bottom plate 44 during operation.

The drain holes 34 are open to the inner volume of water above the main valve seal 41 when the main valve seal 41 is closed against the main valve seat 42, and the upper barrel 10 and lower barrel 20 are allowed to drain (see arrows). The drain valve body 45 is also provided with a drain valve facing 47, and a rubber boss 48, which biases the drain valve facing 47 to move outwardly toward the main valve seat 42. When the main valve seal 41 is opened by downward movement of the lower stem 54, the drain valve body 45 also moves downwardly such that the drain valve facing 47 is moved over the drain holes 34 in the elbow 30. The drain valve facing 47 is then held against the drain holes 34 by bias of the rubber boss 48 and high pressure water flowing past the main valve seal 41, effectively blocking the flow of water out of the drain holes 34 in the elbow 30.

SUMMARY OF THE INVENTION

In an embodiment, a fire hydrant drain includes: an elongated, hollow body having a first portion, a second portion, and a third portion, the first portion configured to protrude a first length radially through an outer wall of a fire hydrant, the second portion continuous with and between the first portion and the third portion, the second portion including a first bend having a first curvature degree and a first curvature direction, and a second bend having a second curvature degree and a second curvature direction, the first curvature degree larger than the second curvature degree, a direction of the first curvature opposite a direction of the second curvature, the first bend between the first portion and the second bend, the third portion extending a second length longer than the first length, an angle between the first length and the third length being less than 90 degrees.

In another embodiment, a fire hydrant drain includes: an elongated, hollow body having a first portion, a second portion, and a third portion, the first portion protruding radially through an outer wall of a fire hydrant and protruding outward from the fire hydrant, the second portion continuous with and between the first portion and the third portion, the second portion including a first bend and a second bend, the first bend between the first portion and the second bend, the first bend and the second bend configured to direct the third portion to extend along an inner surface of the outer wall of the fire hydrant and to press into the inner surface with a pressing force.

In another embodiment, a fire hydrant comprising: an upper barrel, the upper barrel having an outer wall, and inner surface of the outer wall, and an opening through the outer wall; a drain tube having a first portion, a second portion continuous with the first portion, and a third portion continuous with the second portion, the first portion extending through the opening through the outer wall, the second portion including a first bend and a second bend, the first bend connected to the second bend, the third portion extending from the second bend at an acute angle toward the inner surface of the outer wall of the upper barrel.

DETAILED DESCRIPTION OF THE INVENTION

Figure 1:
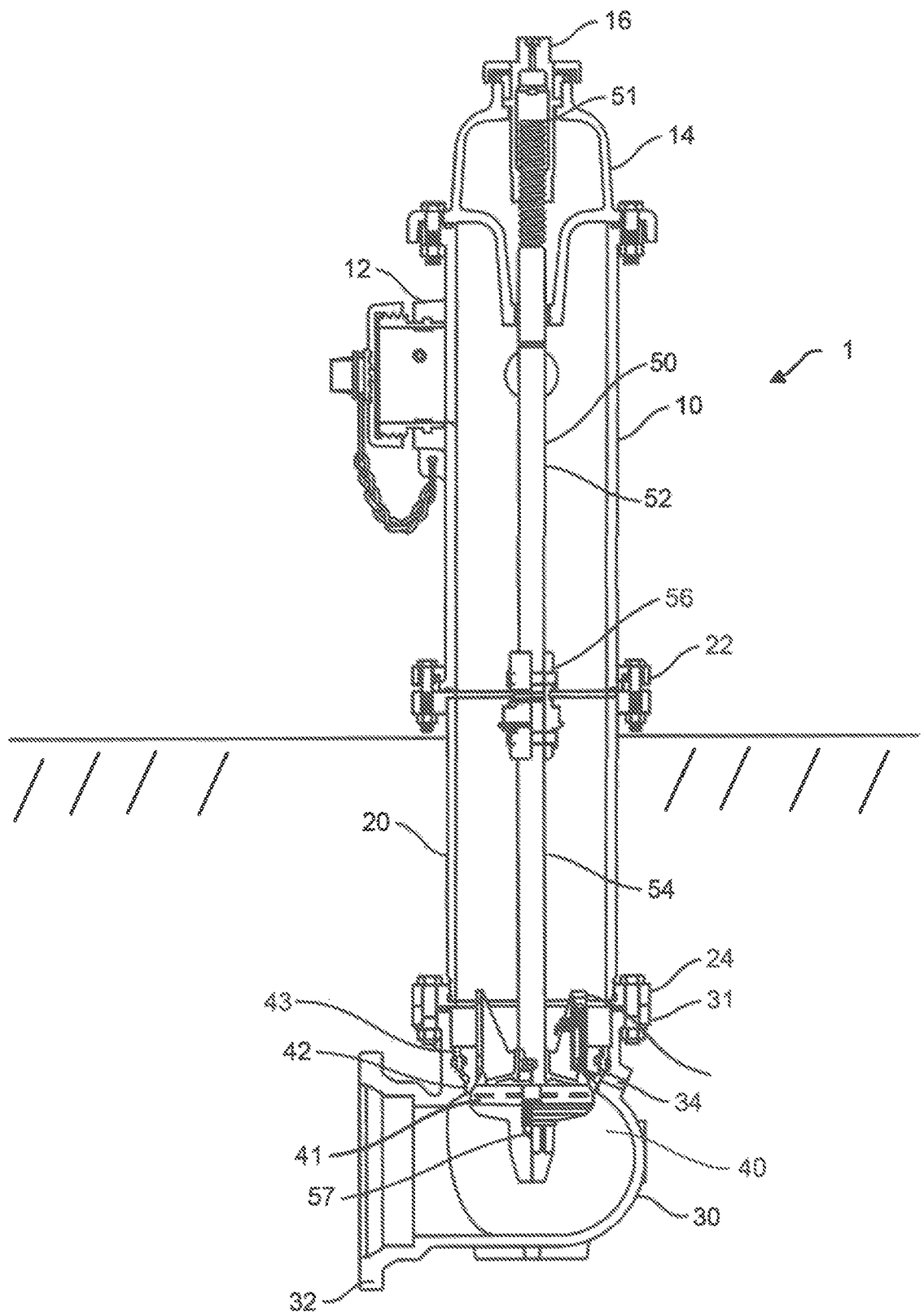
FIG. 1 shows a conventional fire hydrant.
Figure 2:
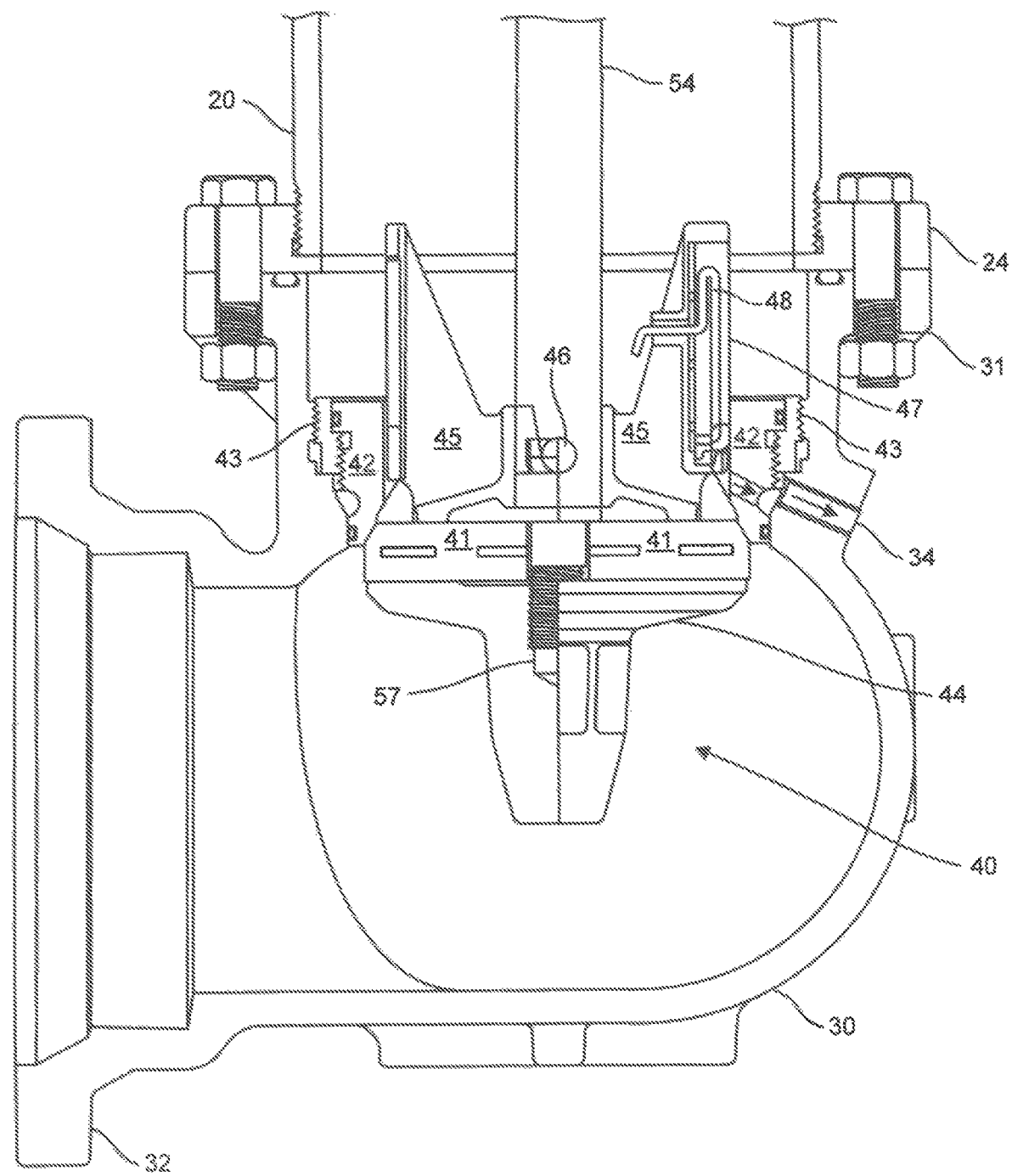
FIG. 2 shows a detailed view of an elbow, main valve assembly, and drain of the fire hydrant of FIG. 1.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "axial" and/or "axially" refer to the relative position/direction of objects along an axis substantially parallel with a center axis of the fire hydrant or other component specified (e.g. fire hydrant elbow). As further used herein, the terms "radial" and/or "radially" refer to the relative position/direction of objects along an axis substantially perpendicular with the center axis. Additionally, the terms "circumferential" and/or "circumferentially" refer to the relative position/direction of objects along a circumference surrounding the center axis.

Figure 3:
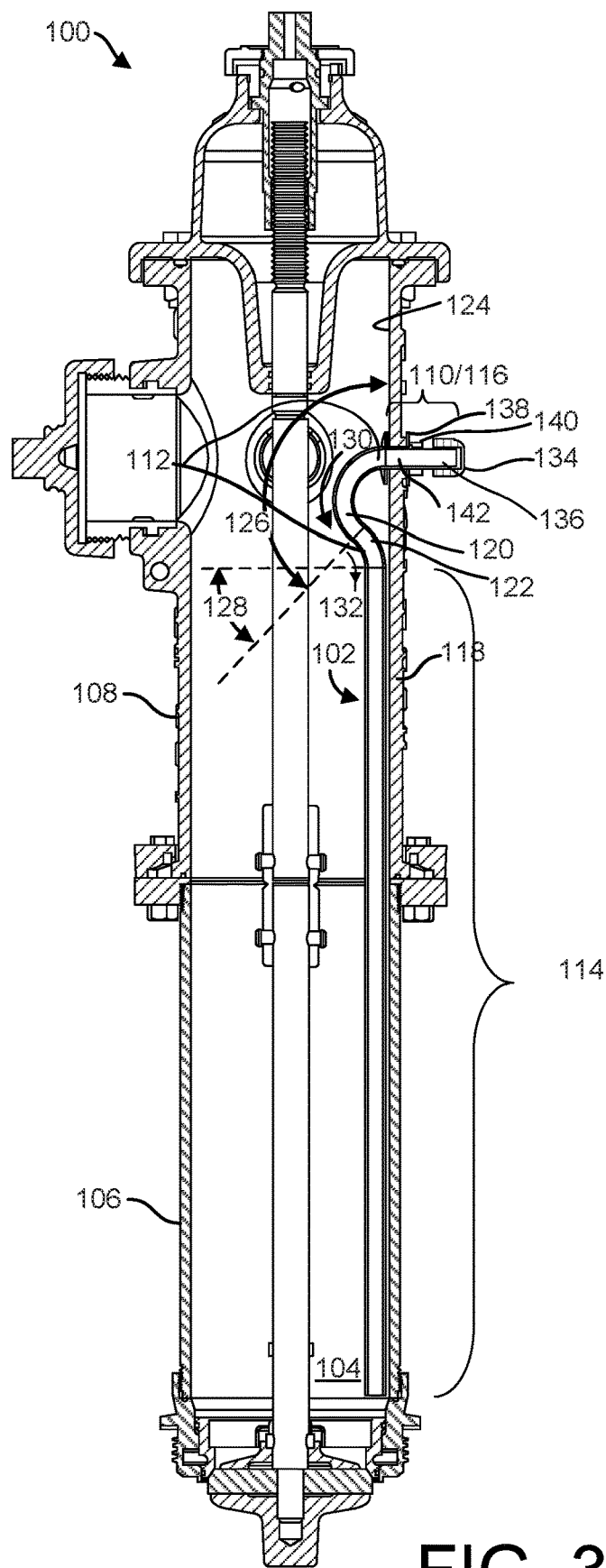
FIG. 3 shows a cross-sectional side view of a fire hydrant with a drain tube biased and pressing against the inside of a fire hydrant barrel wall according to an embodiment of the invention.

FIG. 3 shows a cross-sectional side view of a fire hydrant 100 with a drain tube 102. The drain tube 102 enables an operator to drain fluid (e.g., water) from the bottom 104 of a lower barrel 106 of the fire hydrant 100, through the drain tube 102, out an upper barrel 108 of the fire hydrant 100. The drain tube 102 can drain this fluid from the bottom 104 of the lower barrel 106 without any holes through the lower barrel 106 to either drain the fluid or to secure the drain tube 102 from moving during operation of the fire hydrant 100.

The drain tube 102 is an elongated, hollow body. In the illustrated embodiment, the drain tube 102 is cylindrically shaped, though the drain tube 102 could be an elongated hollow body of other shapes. The drain tube 102 includes a first portion 110, a second portion 112 continuous with the first portion 110, and a third portion 114 continuous with the second portion 112. The first portion 110 is configured to protrude a first length 116 through an outer wall 118 of the fire hydrant 100, such as at the upper barrel 108, as shown in FIG. 3. FIG. 3 shows the first portion 110 extending radially (with respect to a center axis of the fire hydrant 100) through, and outward from, the outer wall 118 at the upper barrel 108. The first portion 110 could be angled variously with respect to the outer wall 118, and extending directly radially outward from the outer wall 118 facilitates easier and less expensive manufacturing, as well as easy use.

The second portion 112 includes a first bend 120 and a second bend 122, the first bend 120 being between the first portion 110 and the second bend 122. The first bend 120 and the second bend 122 are configured to direct the third portion 114 to extend along an inner surface 124 of the outer wall 118 of the fire hydrant 100 and to press into the inner surface 124 with a pressing force. The second portion 112 joins the third portion 114 at a distance D1 from the inner surface 124, and from this distance D1 from the inner surface 124, the third portion 114 is angled acutely into the inner surface 124. In the illustrated embodiment, in which the first portion 110 extends directly radially outward from the outer wall 118 of the fire hydrant 100, an angle between the first portion 110 and the third portion 116 is less than 90 degrees. Points of contact between the third portion 114 and the inner surface 124, and a point of greatest pressure between the third portion 114 and the inner surface 124 can be at the lower barrel 106 and/or the upper barrel 108.

The first portion 110, the second portion 112, and the third portion 114 are configured to achieve a pressing force sufficient to hold the third portion in place against the inner surface 124 of the fire hydrant 100 with no other fasteners required to connect between the lower barrel 106 and the third portion 114, or between the upper barrel 108 and the third portion 114. Fasteners otherwise required could require openings through the outer wall 118 of the lower barrel 106, and seals to seal these openings, which can degrade, leak, and be difficult or expensive to access and repair. The pressing force is sufficient to hold the third portion 114 in place against the inner surface 124 during fluid operation of the fire hydrant 100, withstanding turbulence caused by the flowing fluid. In some embodiments, the pressing force can be equivalent to a clamping force. In some embodiments, the pressing force can be relatively low because the first portion 110 is secured and immobile, and the curvature of the outer wall 118 acts to retain the third portion 114 from sliding in a circumferential direction. In some embodiments, the pressing force can be approximately 89 Newtons (approximately 20 pounds).

To facilitate achievement of the desired pressing force, the first bend 120 can have a first curvature degree 126 that is larger than a second curvature degree 128 of the second bend 122, and the first bend 120 can have a first curvature direction 130 opposite a second curvature direction 132 of the second bend 122. The second bend 122 can be continuous with the first bend 120, or a straight or further curved section can intervene. The first curvature degree 126 and the second curvature degree 128 can be varied as desired, depending on the desired angle for the first portion 110 to extend from the outer wall 118, and depending on the desired pressing force. The distance D1, along with an acute angle A1 at which the third portion 114 extends into the inner surface 124 from the second portion 112, can be determined or varied by varying the first curvature degree 126 and the second curvature degree 128. In the illustrated embodiment, the first bend 120 curves more than 90 degrees and the second bend 122 curves less than 90 degrees.

In the illustrated embodiment, the first portion 110 and the third portion 114 are straight, and the second portion 112 includes the first bend 120 and the second bend 122. Installed in the fire hydrant 100, the third portion 114 can have some flex depending on the rigidity of the third portion 114 and the point of contact with the outer wall 118. Further, in some embodiments, an end 131 of the third portion 114 distal from the second portion 112 can be curved away from the outer wall 118 of the fire hydrant 100. A center axis of each of the first portion 110, the second portion 112, and the third portion 114 are all in the same plane. This design facilitates relative simplicity in manufacturing and relative efficiency of space inside the fire hydrant 100. It is conceived that the first portion 110 and the third portion 114 can have non-straight lengths, though, that the second portion 112 can have further curved or straight lengths, and that center axes of the first portion 110, the second portion 112, and the third portion 114 can be in different planes.

A cap 134 can be removably placed on a free end 136 of the first portion 110, to protect the free end 136 and prevent insects or other debris from entering and obstructing the drain tube 102. A washer or seal 138 can encircle the first portion 110 where the first portion 110 extends through the outer wall 118 to provide a fluid seal between the first portion 110 and the outer wall 118. A securing nut 140 can fasten the first portion 110 in place where the first portion 110 extends from the outer wall 188, such as by threaded engagement with a threaded portion 142 of the first portion 110.

While a specific design for a fire hydrant is shown in the figures and described with respect to the figures, other fire hydrant models can use inventive concepts described herein.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fire hydrant drain comprising:
    an elongated, hollow body having a first portion, a second portion, and a third portion,
    the first portion protruding radially through an outer wall of a fire hydrant and protruding outward from the fire hydrant,
    the second portion continuous with and between the first portion and the third portion, the second portion including a first bend and a second bend, the first bend between the first portion and the second bend, the first bend and the second bend configured to direct the third portion to extend along an inner surface of the outer wall of the fire hydrant and to press into the inner surface with a pressing force,
    the third portion being held in place by the pressing force against the inner surface.

2. The fire hydrant drain of claim 1, wherein the fire hydrant includes an upper barrel and a lower barrel, and the third portion traverses the upper and lower barrel of the fire hydrant.

3. The fire hydrant drain of claim 1, wherein the fire hydrant includes an upper barrel and a lower barrel, the inner surface of the fire hydrant includes an upper barrel inner surface and a lower barrel inner surface, and the third portion presses most strongly into the inner surface of the fire hydrant at the upper barrel inner surface.

4. The fire hydrant drain of claim 1, wherein the fire hydrant includes an upper barrel and a lower barrel, the inner surface of the fire hydrant includes an upper barrel inner surface and a lower barrel inner surface, and the third portion presses most strongly into the inner surface of the fire hydrant at the lower barrel inner surface.

5. The fire hydrant drain of claim 1, wherein an end of the third portion distal from the second portion is curved away from the outer wall of the fire hydrant.

6. The fire hydrant drain of claim 1, wherein the pressing force is greater than 50 Newtons.

7. The fire hydrant drain of claim 1, wherein the first bend curves more than 90 degrees and the second bend curves less than 90 degrees.

8. A fire hydrant drain comprising:
    an elongated, hollow body having a first portion, a second portion, and a third portion,
    the first portion configured to protrude a first length radially through an outer wall of a fire hydrant,
    the second portion continuous with and between the first portion and the third portion, the second portion including a first bend having a first curvature degree and a first curvature direction, and a second bend having a second curvature degree and a second curvature direction, the first curvature degree larger than the second curvature degree, a direction of the first curvature opposite a direction of the second curvature, the first bend between the first portion and the second bend,
    the third portion extending a second length,
    an angle between the first length and the third length being less than 90 degrees.

9. The fire hydrant drain of claim 8, wherein the first length is straight.

10. The fire hydrant drain of claim 8, wherein the second length is longer than the first length.

11. The fire hydrant drain of claim 8, wherein a center axis of the first portion, the second portion, and the third portion are in the same plane.

12. The fire hydrant drain of claim 8, wherein the elongated, hollow body is a tube.

13. The fire hydrant drain of claim 12, wherein the tube has a circular cross section.

14. The fire hydrant drain of claim 8, wherein the first bend curves more than 90 degrees and the second bend curves less than 90 degrees.

15. A fire hydrant comprising:
- an upper barrel, the upper barrel having an outer wall, and inner surface of the outer wall, and an opening through the outer wall;
- a drain tube having a first portion, a second portion continuous with the first portion, and a third portion continuous with the second portion,
- the first portion extending through the opening through the outer wall,
- the second portion including a first bend and a second bend, the first bend connected to the second bend,
- the third portion extending from the second bend at an acute angle greater than 0 degrees toward the inner surface of the outer wall of the upper barrel.

16. The fire hydrant of claim 15, wherein the third portion presses into the inner surface of the outer wall of the upper barrel with a pressing force.

17. The fire hydrant of claim 15, further comprising a lower barrel connected in line with the upper barrel, the lower barrel having an outer wall, the outer wall having an inner surface, the third portion pressing into the inner surface of the outer wall of the lower barrel with a pressing force.

18. The fire hydrant of claim 15, wherein the first portion extends directly radially outward from the outer wall of the upper barrel, the first bend curves more than 90 degrees, and the second bend curves less than 90 degrees.

19. The fire hydrant of claim 15, further comprising a lower barrel connected in line with the upper barrel, the lower barrel having a cylindrical outer wall entirely continuous and solid.

\* \* \* \* \*